(12) United States Patent
Reddy et al.

(10) Patent No.: US 9,911,345 B2
(45) Date of Patent: Mar. 6, 2018

(54) SYSTEM AND METHOD FOR DETECTING MISALIGNED STATIONARY OBJECTS

(71) Applicant: HONEYWELL INTERNATIONAL INC., Morris Plains, NJ (US)

(72) Inventors: Mahipal Reddy, Andhra Pradesh (IN); Anil Kumar Songa, Karnataka (IN)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 64 days.

(21) Appl. No.: 15/051,890

(22) Filed: Feb. 24, 2016

(65) Prior Publication Data
US 2017/0243498 A1 Aug. 24, 2017

(51) Int. Cl.
G08G 5/06 (2006.01)
G08G 5/04 (2006.01)
G01C 23/00 (2006.01)

(52) U.S. Cl.
CPC ............. *G08G 5/065* (2013.01); *G01C 23/00* (2013.01); *G08G 5/04* (2013.01); *G08G 5/045* (2013.01)

(58) Field of Classification Search
CPC ................................ G08G 5/065; G08G 5/04
See application file for complete search history.

(56) References Cited

U.S. PATENT DOCUMENTS

| | | | |
|---|---|---|---|
| 6,952,631 B2 | 10/2005 | Griffith et al. | |
| 7,164,118 B2 | 1/2007 | Anderson et al. | |
| 8,019,529 B1 | 9/2011 | Sharma et al. | |
| 9,116,240 B2 | 8/2015 | Hall | |
| 2001/0040505 A1* | 11/2001 | Ishida | G01C 21/3697 340/435 |
| 2003/0193411 A1* | 10/2003 | Price | G01C 23/005 340/973 |
| 2006/0164261 A1* | 7/2006 | Stiffler | G01C 23/00 340/945 |
| 2008/0140272 A1* | 6/2008 | Zadrozynski | G08G 5/0021 701/14 |
| 2008/0215192 A1* | 9/2008 | Hardman | G01C 23/00 701/3 |

(Continued)

FOREIGN PATENT DOCUMENTS

| | | |
|---|---|---|
| EP | 1918898 A2 | 5/2008 |
| EP | 2437234 A1 | 4/2012 |
| EP | 2722835 A2 | 4/2014 |

OTHER PUBLICATIONS iPad Pilot News Sporty's Pilot Shop; 10 tips to increase your runway awareness with ForeFlight—iPad Pilot News; Dec. 16, 2015; Copyright © 2015 iPad Pilot News. All Rights Reserved.

(Continued)

*Primary Examiner* — Frederick M Brushaber
(74) *Attorney, Agent, or Firm* — Lorenz & Kopf, LLP (57) ABSTRACT

Provided is a navigation system that processes a route plan and data from the surrounding environment to identify a potential threat of undesirable contact anywhere along the route plan. The provided navigation system generates an informative, anticipative display of the vehicle's surrounding environment. When a potential threat is identified, the provided navigation system provides a visual threat alert that enables rerouting the vehicle, thereby averting the potential threat.

13 Claims, 4 Drawing Sheets

(56) References Cited

U.S. PATENT DOCUMENTS

| | | |
|---|---|---|
| 2009/0212992 A1* | 8/2009 | Fouet .................. G08G 5/0021 |
| | | 342/38 |
| 2012/0200433 A1 | 8/2012 | Glover et al. |
| 2013/0070095 A1 | 3/2013 | Yankun et al. |
| 2013/0162632 A1* | 6/2013 | Varga ................... G06T 19/006 |
| | | 345/419 |
| 2014/0267422 A1 | 9/2014 | Feyereisen et al. |
| 2014/0278037 A1 | 9/2014 | Choksi et al. |
| 2015/0051757 A1* | 2/2015 | Cox ...................... B64D 45/00 |
| | | 701/3 |
| 2015/0170525 A1 | 6/2015 | Conner et al. |

OTHER PUBLICATIONS

Dennstaedt S.; Automated Ceiling Report—FloreFlight; Apr. 15, 2015.
Stuart; FlightGear Forum, Using a canvas map in the GUI, Sep. 17, 2012.
Extended EP Search Report for Application No. 17153649.3-1557 dated Jul. 21, 2017.

* cited by examiner

SYSTEM AND METHOD FOR DETECTING MISALIGNED STATIONARY OBJECTS

TECHNICAL FIELD

Embodiments of the subject matter described herein relate generally to vehicle navigation systems and, more particularly, to a vehicle navigation system that detects misaligned stationary objects.

BACKGROUND

For some types of vehicles, surface navigation, particularly in compact areas, can be challenging. Aircraft are particularly challenging during surface navigation, due to their shape. When an aircraft is surface transiting through a region, even slightly misaligned stationary objects may pose a risk of undesirable contact with the aircraft. Although rare and unlikely, even slight contact, such as a wing tip collision, is undesirable.

Aircraft surface navigation usually comprises taxiing in and out of the airport terminal. Generally, the pilot and the co-pilot follow ground operational procedures while taxiing, and rely on display instruments to identify neighboring traffic and objects. In addition to following ground operational procedures, they use visual judgment to confirm that the wingtip of the aircraft does not collide with any stationary or moving objects such as other aircraft, vehicles, buildings or airport structures. A misjudgment may occur due to a lack of a 360 degree view and/or poor weather conditions, a failure to anticipate a dynamic position change within the surroundings, and/or a failure to properly visualize an expected area. In addition, a pilot is not able to see aircraft with engines off on their cockpit displays. Although rare, even a slight misjudgment may result in an undesirable contact.

Accordingly, a navigation system that processes a route plan and data from the surrounding environment to identify a potential threat of undesirable contact anywhere along the route plan is desired. The desired navigation system generates an informative, anticipative display of the vehicle's surrounding environment. When a potential threat is identified, the desired navigation system provides a visual threat alert that enables rerouting the vehicle, or communicating with the controller in clearing the original planned route, thereby averting the potential threat. The desired navigation system thereby improves overall vehicle safety, saves time, and reduces cognitive workload.

BRIEF SUMMARY

This summary is provided to introduce a selection of concepts in a simplified form that are further described below in the detailed description section. This summary is not intended to identify key features or essential features of the claimed subject matter, nor is it intended to be used as an aid in determining the scope of the claimed subject matter.

A navigation method for use in a host vehicle during transit through a region, the host vehicle including an on-board display unit, is provided. The navigation method comprising: receiving data associated with vehicles in the region; obtaining, from a map data source, map data corresponding to the region; processing data associated with vehicles in the region, map data, and a route plan to identify a potential threat to the route plan and its location; generating, on the display unit, a display including a map of the region, the route plan, and a symbol for the host vehicle at its location; and overlaying a threat symbol representative of the potential threat on the map at the threat location.

Also provided is a navigation system for use in a host vehicle during transit through a region, the host vehicle including an on-board display unit, the navigation system comprising: a source of data associated with vehicles in the region; a source of map data corresponding to the region; a processor coupled to the source of data associated with vehicles in the region and the source of map data, and configured to (i) identify a potential threat to a route plan and its location based on data associated with vehicles in the region and map data, (ii) generate, on the display unit, a display including a map of the region, the route plan, and a symbol for the host vehicle, and (iii) overlay, on the display, a threat symbol representative of the potential threat at the threat location.

Another navigation method for use in a host aircraft during transit through a region for a host aircraft including an on-board display unit is provided, the navigation method comprising: receiving data associated with vehicles in the region; referencing an aircraft database to obtain aircraft dimensions; obtaining, from an airport database, map data corresponding to the region; processing data associated with vehicles in the region, map data, aircraft dimensions, and a surface route plan to identify a potential threat and corresponding threat location; generating, on the display unit, a display including a map of the region, the surface route plan, and a symbol for the host aircraft at its location; and overlaying a threat symbol representative of the potential threat on the map at the threat location.

Other desirable features will become apparent from the following detailed description and the appended claims, taken in conjunction with the accompanying drawings and this background.

BRIEF DESCRIPTION OF THE DRAWINGS

A more complete understanding of the subject matter may be derived from the following detailed description taken in conjunction with the accompanying drawings, wherein, like reference numerals denote like elements, and.

DETAILED DESCRIPTION

The following Detailed Description is merely exemplary in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over any other implementations. Furthermore, there is no intention to be bound by any expressed or implied theory presented in the preceding Technical Field, Background, Brief Summary or the following Detailed Description.

Techniques and technologies may be described herein in terms of functional and/or logical block components and with reference to symbolic representations of operations, processing tasks, and functions that may be performed by various computing components or devices. Operations, tasks, and functions are sometimes referred to as being a set of "instructions;" such instructions may be stored in memory or a database and then computer-executed, computerized, software-implemented, or computer-implemented. The instructions may also be converted into hardware using logic gates and/or a field programmable gate array (FPGA).

In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

The following descriptions may refer to elements or nodes or features being "coupled" together. As used herein, unless expressly stated otherwise, "coupled" means that one element/node/feature is directly or indirectly joined to (or directly or indirectly communicates with) another element/node/feature, and not necessarily mechanically. Thus, although the drawings may depict one exemplary arrangement of elements, additional intervening elements, devices, features, or components may be present in an embodiment of the depicted subject matter.

As an overview, a host vehicle receives a surface route plan through a region, and the below described navigation system processes the route plan and data from the environment surrounding the region to identify a potential threat (of undesirable contact). The potential threat may be anywhere along the route plan, from a starting point to the end point. The navigation system generates a comprehensive display of a surface map including the entire route plan. When a potential threat is identified, the navigation system displays a visually distinguishable threat symbol on the surface map at the threat location; the visually distinguishable threat symbol provides a crew with advanced awareness of the potential threat, and provides ample reroute time. Non-limiting examples of threats comprise a parked aircraft that is too large for its parking stall, an aircraft that is parked in a misaligned manner in its parking stall, an emergency vehicle that is obscuring a portion of the route plan, and the like.

Figure 1:
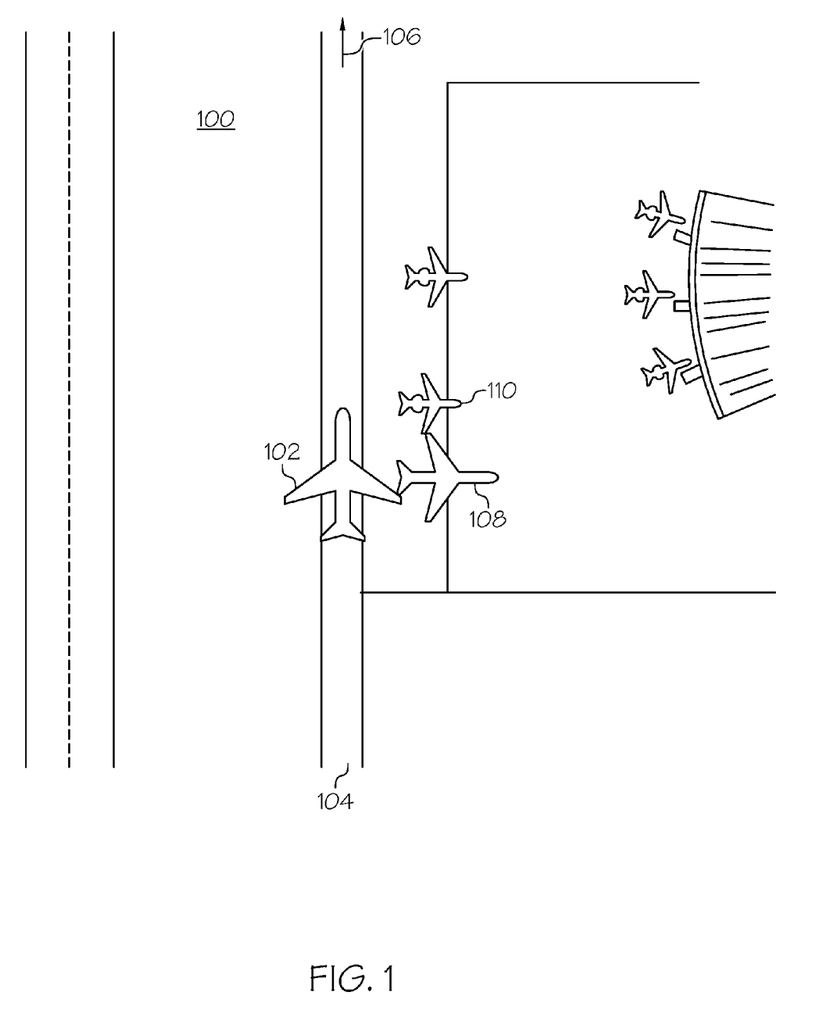
FIG. 1 is a display of a top down view of an aircraft on a surface route wherein a potential for undesirable contact may be realized.

FIG. 1 is a display of a top down view of a host aircraft 102 on a surface route 104 wherein a potential for undesirable contact may be realized. Surface route 104 provides a path for host aircraft 102 in the direction of arrow 106 through a region 100 of an airport. Parked aircraft 108 is too large for its parking stall, causing a portion of the parked aircraft 108 to extend toward surface route 104, so if aircraft 102 proceeds forward, a potential threat for a wing tip collision by host aircraft 102 may be realized as an actual wing tip collision. In contrast, parked aircraft 110 does not provide a potential threat.

Figure 2:
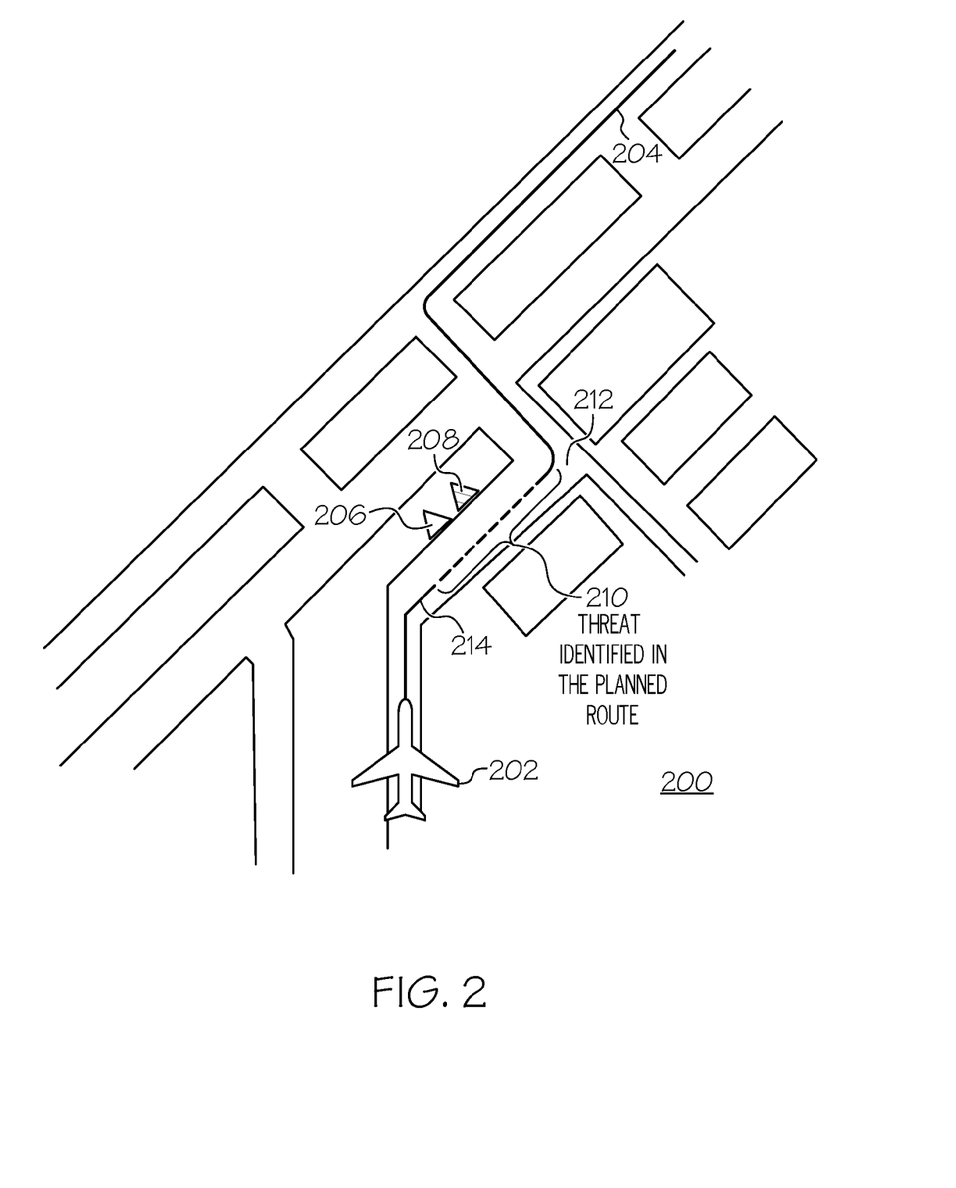
FIG. 2 is a display of a top down view of an aircraft on a surface route wherein there is a potential undesirable contact, showing visual alerts according to an exemplary embodiment.

In many instances, a host aircraft 102 performs surface navigation with only input from radar or near-distance object detection systems. Such object detection systems are limited to short distances from the host vehicle, and are not capable of providing meaningful look-ahead information, and a potential threat of a wingtip collision as shown in FIG. 1 is not detected until the host aircraft 102 is very close to the potential threat of parked aircraft 108. In such instances, rerouting host aircraft 102 is quite cumbersome, time consuming, and cognitively demanding. In addition to being limited to short distances, radar and other common near-distance object detection systems are not able to provide look-ahead information around corners. FIG. 2 provides a top down view showing a surface route having corners.

FIG. 2 is a display of a top down view of a host aircraft 202 on a surface route 204 wherein there is a potential undesirable contact, showing visual alerts according to an exemplary embodiment. Although the map in FIG. 2 is simplified for discussion, in practice, the exemplary embodiment generates a comprehensive surveillance map of the region 200 that reflects the integration of a variety of sources of information about the host vehicle's environment, including geographic position, location, and movement data for moving and stationary vehicles, aircraft size and dimension data, and airport map data.

In FIG. 2, host aircraft 202 is assigned surface route 204 through region 200. The surface route 204 comprises a first corner 214 and a second corner 212. The provided vehicle navigation system has identified a stationary aircraft to be a potential threat for host aircraft 202 on surface route 204. To communicate the identified potential threat, visually distinguishable threat symbol 208 is displayed, at the location of the stationary aircraft, providing a first visual alert. The provided vehicle navigation system has also determined that segment 210 of surface route 204 is most affected by the potential threat designated by threat symbol 208, and displayed segment 210 in a visually distinguishable manner, providing a second visual alert. As can be seen, the location of the potential threat is ahead (in time and space) of the host aircraft 202, and around first corner 214, as such, the exemplary embodiment provides look-ahead information and ample time for a crew or air traffic controller response, minimizing the cognitive demand associated with a last minute correction. A comprehensive surveillance map of the surface route 204 with identified potential threats, as shown in FIG. 2, may be generated by the vehicle navigation process of FIG. 3 and the vehicle navigation system of FIG. 4.

Figure 3:
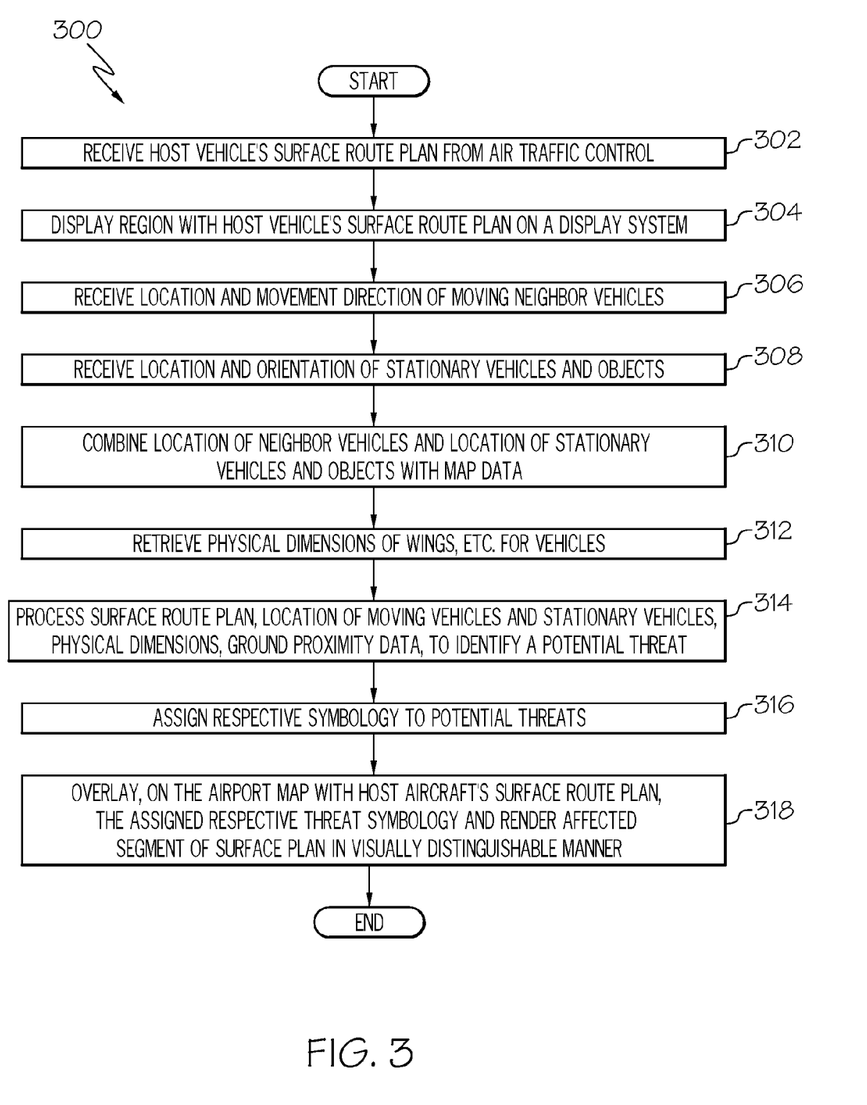
FIG. 3 is a flow chart of a vehicle navigation process, in accordance with an exemplary embodiment.

FIG. 3 is a flow chart of a vehicle navigation process 300, in accordance with an exemplary embodiment. Although the steps of process 300 are provided in an order for discussion, one with skill in the art will readily appreciate that steps may be rearranged, added or omitted without straying from the scope of the invention. In the examples provided herein, the vehicle is an aircraft and the route plan is a surface route plan, however, vehicle navigation process 300 may be employed by a variety of vehicles.

In the embodiment, the host vehicle's surface route plan is received from air traffic control (ATC) at STEP 302. However, it is readily appreciated that in an non-ATC-towered airport, a pilot may generate a route plan by choosing a destination and providing intermediate points. In STEP 304, the vehicle navigation process 300 generates a display including a comprehensive map of the region 200 with the surface route plan 204, and a symbol for the host aircraft 202 at its location.

Next, vehicle navigation process 300 receives, from various data sources, data associated with vehicles and objects in the region. In the following discussion, STEPS 306, 308, and 312 are separated out to describe various sources of data and the information provided by each source of data, however STEPS 306, 308 and 312 may be combined and referred to as "receiving data associated with vehicles in the region." In STEP 306, "neighbor vehicle data" is received. As used herein, "neighbor vehicle data" comprises vehicle identification information (including vehicle type, and vehicle operator) and geographical position data for moving vehicles in the region surrounding the host vehicle. As used herein, geographical position data comprises a position, location, and an orientation. Sources of neighbor vehicle data may include, without limitation: traffic collision avoidance system (TCAS), automatic dependent surveillance-broadcast (ADS-B) system, wing tip sensors, and ground proximity sensors that are located on the surrounding aircraft.

Figure 4:
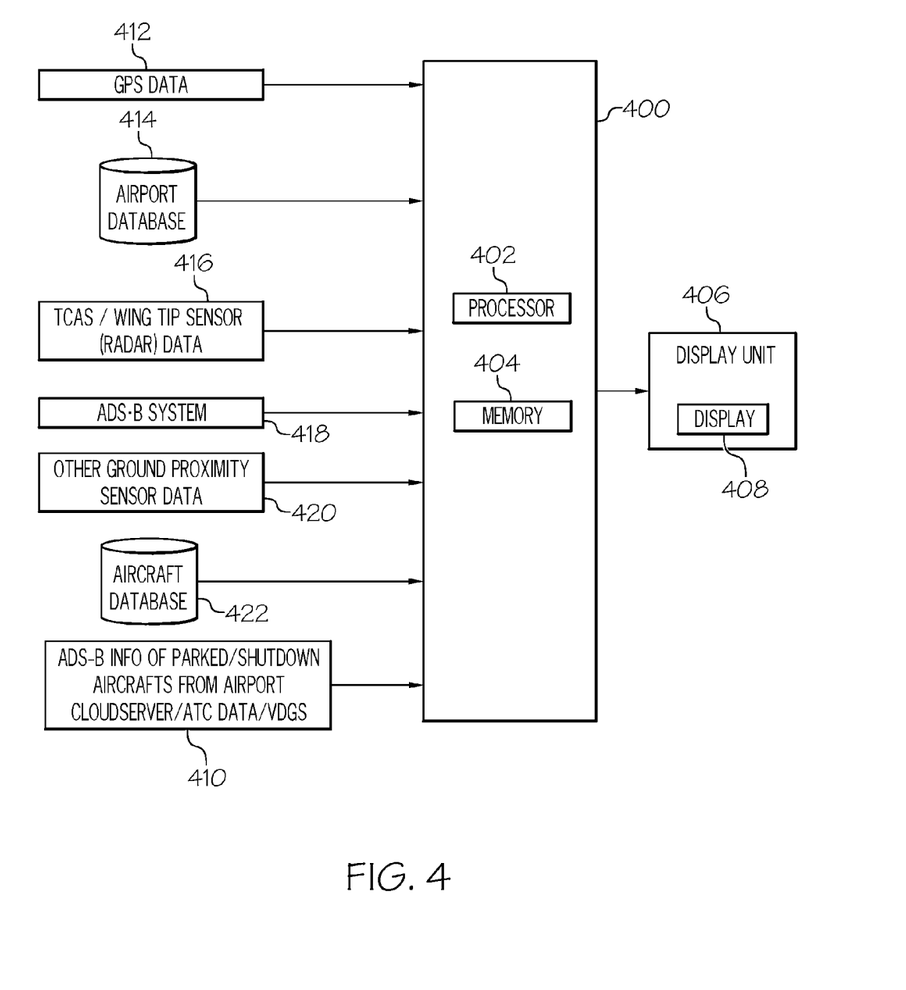
FIG. 4 is a block diagram for a vehicle navigation system, in accordance with the exemplary embodiment.

At STEP 308, "stationary vehicle data" is received. As used herein, "stationary vehicle data" comprises vehicle identification information (including vehicle type, vehicle operator) and geographical position data for stationary vehicles and objects in the region surrounding the host vehicle. Sources of stationary vehicle data may include, without limitation: a remote source (such as a cloud server), ground proximity sensors that are physical sensors strategically located in the airport, air traffic control, an aircraft database, and proprietary surveillance source data. In an embodiment, a cloud server receives, via TCAS, ADS-B, and/or a visual guidance docking system, last transmitted stationary vehicle data of the stationary vehicles. The cloud server may also store the last transmitted stationary vehicle data for retrieval by the vehicle navigation system (FIG. 4 vehicle navigation system 400).

In STEP 310, the data from STEPS 306 and 308 (i.e., the data comprising position, orientation, and location of neighbor vehicles and stationary vehicles) is combined with map data (map data is described in connection with FIG. 4). As a result of STEP 310, the comprehensive surface map is populated with vehicles and objects at their respective locations, in their respective positions and orientations.

In STEP 312, the data resulting from STEP 310 is augmented by referencing an aircraft database 422 to obtain aircraft dimensions in order to flesh out the shapes of the vehicles and objects at their respective positions, orientations, and locations within the region. For example, as a result of STEP 310, a plurality of vehicles may be present within the region 200, and vehicle navigation process 300 may, for each vehicle of the plurality of vehicles, parse neighbor vehicle data and stationary vehicle data to isolate a vehicle identification, type, make, and/or model for each respective vehicle, and using the parsed vehicle identification, type, make and/or model as a key for use with a lookup table stored in the aircraft database 422. In an example, presenting "Boeing 727" to the lookup table might provide information as to the length, location and orientation of wings, and wingspan of that aircraft. Those dimensions may then be compared to map data, such as dimensions and orientations of parking stalls or other airport features, that is provided by the airport database 414. At STEP 314 data from the previous steps is processed with the surface route plan 204 to identify a potential threat to the surface route plan 204. STEP 314 may comprise identifying that a parked or misaligned aircraft intrudes on a margin of safety from the surface route plan 204 of the host aircraft, thereby identifying the parked or misaligned aircraft as a potential threat.

The potential threat may be further distinguished by threat type, such as an overly large aircraft or a misaligned parked aircraft. A default margin of safety, such as a three foot clearance on all sides of the host aircraft, may be pre-programmed into memory 404.

When a potential threat is identified, it is assigned a visually distinguishable threat symbol (STEP 316) representative of the potential threat. The threat symbol that gets assigned to a potential threat may be determined by using process results from STEP 312 and/or STEP 314 with a pre-arranged lookup table of threat types and corresponding threat symbols stored in memory. Visually distinguishable threat symbols may be application dependent, and may comprise a plurality of different visually distinguishable symbols, for example, to distinguish between aircraft and stationary objects, to distinguish between aircraft types and sizes, to distinguish between wrongly parked vehicles and too large vehicles, etc. Threat symbols may vary in size and shape in addition to employing display techniques such as highlighting, flashing, color coding, changes in opacity, dots, dashes, and the like to create visual distinguish-ability.

In STEP 318, the threat symbol 208 for the potential threat is overlaid on the comprehensive map of the region 200 at the threat location. The display of the threat symbol indicating the potential threat is a first visual alert. In embodiments that generate an aural alert, the aural alert may also be generated at STEP 318. Also at STEP 318, when the vehicle navigation process 300 determines a segment of the surface route plan 204 that is affected by the potential threat, the segment may be displayed in a visually distinguishable manner (for example, segment 210), providing a second visual alert.

In response to the visual alerts to the potential threat, a pilot, crew, or air traffic controller may re-route the host vehicle through the region. Because the exemplary embodiment provides the visual alert to a potential threat ahead of time, re-routing may be performed seamlessly, averting the potential threat, and minimizing the cognitive demands associated with last minute rerouting.

FIG. 4 is a simplified block diagram of a vehicle navigation system 400, according to an embodiment. As described above, the vehicle navigation system 400 may be used by a host vehicle during surface transit through a region. The vehicle navigation system 400 receives and processes aircraft ID, position, direction of movement, ground speed, ground track and aircraft metadata for (i) moving neighbor vehicles and (ii) stationary vehicles and objects. Within the vehicle navigation system 400, the processor 402 is coupled to memory 404, and configured perform the vehicle navigation process 300 steps described in connection with FIG. 3. In addition, data from the TCAS may be utilized to provide a visual display of nearby traffic through a Cockpit Display of Traffic Information (CDTI), not shown.

The vehicle navigation system 400 receives data from multiple sources. The sources of data coupled to processor 402 include, without limitation, a global positioning system (GPS) 412, an airport database 414, a traffic collision avoidance system (TCAS) 416, an automatic dependent surveillance-broadcast (ADS-B) system 418, ground proximity sensors 420, an aircraft database 422, and a remote source of stationary vehicle data 410. The vehicle navigation system 400 provides command and control to a display unit 406, in order to render a two or three dimensional surface map, as display 408. The vehicle navigation system 400 may also have command and control over an audio output device, not shown.

Image-generating devices suitable for use as the display unit 406 may take the form of a primary flight display (PFD) and a multi-function display (MFD), and include various analog (e.g., cathode ray tube) and digital (e.g., liquid crystal, active matrix, plasma, touch sensitive, etc.) display devices. In certain embodiments, display unit 406 may assume the form of a Head-Down Display (HDD) or a Head-Up Display (HUD) included within an aircraft's Electronic Flight Instrument System (EFIS). The display 408 may be a two dimensional airport moving map (2D AMM) or a three dimensional airport moving map (3D AMM).

Generally, when an aircraft is parked and its engine turned off, it ceases ADS-B broadcast of its position. Therefore, when an aircraft's parking brakes are set and prior to engine off, GPS coordinates of the aircraft may be received by and stored on the source of stationary vehicle data 410. In an embodiment, the source of stationary vehicle data 410 is an airport cloud server. In cases where an aircraft with its engine off is towed away by another ground vehicle, the ground vehicle may broadcast to the source of stationary vehicle data the towed aircraft information with its corrected coordinates.

A map data source provides maps of the region through which the vehicle is traveling; in an embodiment, the map data source is an airport database 414. Accordingly, the map data source may provide information such as dimensions, locations, and orientations of taxiways, runways, parking stalls, buildings and installations. As described above, the processor 402 processes map data with position and orientation data, and with aircraft dimension data in the course of identifying a potential threat.

In practice, processor 402 may comprise, or be associated with, any suitable number of individual microprocessors, flight control computers, navigational equipment, memories (such as memory 404), power supplies, storage devices (such as databases), interface cards, and other standard components known in the art. In this respect, the processor 402 may include or cooperate with any number of software models, software programs (e.g., aircraft display programs) or instructions designed to carry out the various methods, process tasks, calculations, and control/display functions described below (for example, memory 404 may be programmed with predefined dimensions used to create a margin of safety around a host aircraft, and may comprise lookup tables for threat symbols).

As described above, the vehicle navigation system 400 generates, on display unit 406, a comprehensive surveillance picture of the region, in the form of a two or three dimensional display 408 that includes a map of the region 200 and the surface route plan 204 through the region 200. The visually distinguishable threat symbol 208 is overlaid on the map of the region at its threat location. In an embodiment, the processor 402 is further configured to identify a segment 210 of the surface route plan 204 most affected by the potential threat and render the segment 210 in a visually distinguishable manner. In an embodiment, the processor is further configured to provide an audio alert corresponding to the identified potential threat; the audio alert may include a sound and instructions.

In addition to generating the comprehensive display 408 for the on-board display unit 406, the comprehensive display 408 may be broadcasted/transmitted/presented to air traffic control (ATC) on an integrated display system that features an interface developed for air traffic controllers, enabling safety, efficiency and capacity improvements on the airport surface.

Processor 402 may be distributed, and reside within one or any combination of: an onboard maintenance system, a remote or mobile electronic device, and a stationary location, such as a ground station or control tower; when processor 402 is distributed, the processing of the data and identification of the potential threat may be performed either in a portion of the processor 402 that is located external to the vehicle, or in the portion of processor 402 that is on-board the vehicle. For example, processing data to identify a potential threat may be done at a ground station or in an air traffic control tower, with results passed to a respective host aircraft for display and alerts. Distributing the processing functionality this way may allow faster processing since air traffic control or the ground station may have more access to relevant databases and neighbor vehicle positioning information than the host aircraft.

Thus, there has been provided a navigation system 400 that processes a route plan and data from the surrounding environment to identify a potential threat of undesirable contact anywhere along the route plan. The navigation system 400 generates an informative, anticipative display of the vehicle's surrounding environment. When a potential threat is identified, the navigation system provides a visual threat alert that enables rerouting the vehicle, thereby averting the potential threat. The provided navigation system thereby improves overall vehicle safety, saves time, and reduces cognitive workload.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A navigation method for use in a host vehicle during transit through a region, the host vehicle including a primary flight display, the navigation method comprising:
    receiving data associated with vehicles in the region;
    obtaining, from a map data source, map data corresponding to the region;
    processing data associated with vehicles in the region, map data, and a route plan to identify a potential threat on the route plan, the potential threat having a threat location between a starting point and an ending point of the route plan;
    generating, on the primary flight display, a display including a map of the region, the route plan, and a symbol for the host vehicle at its location;
    overlaying a threat symbol representative of the potential threat on the map at the threat location;
    identifying, by the processor, a segment of the route plan most affected by the potential threat and rendering the segment in a visually distinguishable manner; and
    storing a stationary vehicle's last transmitted data comprising geographic coordinates, vehicle type, and vehicle identification.

2. The navigation method of claim 1, further comprising assigning the threat symbol to the potential threat based on referencing a lookup table.

3. The navigation method of claim 1, wherein receiving data associated with vehicles in the region comprises:
receiving moving vehicle data from one of the set including: traffic collision avoidance system (TCAS), automatic dependent surveillance-broadcast (ADS-B) system, and ground proximity sensors located on a surrounding aircraft; and
receiving stationary vehicle data from a remote source.

4. The navigation method of claim 1, wherein processing data associated with vehicles in the region, map data, and a route plan to identify a potential threat to the route plan comprises referencing an aircraft database to obtain aircraft dimensions.

5. The navigation method of claim 1, further comprising generating an audio alert corresponding to the potential threat.

6. The navigation method of claim 1, wherein the host vehicle is an aircraft and the route plan is a surface route plan at an airport.

7. A navigation system for use in a host vehicle during transit through a region, the host vehicle including a primary flight display, the navigation system comprising:
a source of data associated with stationary vehicles in the region;
a source of data associated with moving vehicles in the region, that is different from the source of data associated with stationary vehicles in the region;
a source of map data corresponding to the region;
a processor coupled to the source of data associated with stationary vehicles in the region, the source of data associated with moving vehicles in the region, and the source of map data, and configured to (i) identify a potential threat on the route plan, the potential threat having a threat location between a starting point and an ending point of the route plan, and identified based on processing data associated with stationary vehicles in the region, data associated with moving vehicles in the region, and map data, (ii) generate, on the primary flight display, a display including a map of the region, the route plan, and a symbol for the host vehicle, (iii) overlay, on the display, a threat symbol representative of the potential threat at the threat location, (iv) identify a segment of the route plan most affected by the potential threat and render the segment in a visually distinguishable manner, and (v) store a vehicle's last transmitted stationary vehicle data comprising geographic coordinates, vehicle type, and vehicle identification.

8. The navigation system of claim 7, wherein the processor is further configured to assign the threat symbol to the potential threat based on referencing a lookup table.

9. The navigation system of claim 7, further comprising an aircraft database coupled to the processor, and wherein the processor is further configured to reference the aircraft database to obtain aircraft dimensions.

10. The navigation system of claim 7, wherein the processor is further configured to generate an audio alert corresponding to the potential threat.

11. The navigation system of claim 7, wherein the host vehicle is an aircraft and the route plan is a surface route plan at an airport.

12. A navigation method for use in a host aircraft during transit through a region, the host aircraft including a multi-function display (MFD), the navigation method comprising:
receiving data associated with vehicles in the region;
referencing an aircraft database to obtain aircraft dimensions;
obtaining, from an airport database, map data corresponding to the region;
processing data associated with vehicles in the region, map data, aircraft dimensions, and a surface route plan to identify a potential threat on the route plan, the potential threat having a threat location between a starting point and an ending point of the route plan;
generating, on the MFD, a display including a map of the region, the surface route plan, and a symbol for the host aircraft at its location;
overlaying a threat symbol representative of the potential threat on the map at the threat location;
identifying, by the processor, a segment of the route plan most affected by the potential threat and rendering the segment in a visually distinguishable manner; and
storing a vehicle's last transmitted stationary vehicle data comprising geographic coordinates, vehicle type, and vehicle identification.

13. The navigation method of claim 12, further comprising assigning the threat symbol to the potential threat based on referencing a lookup table.

* * * * *